US006920478B2

(12) United States Patent
Mendiola et al.

(10) Patent No.: US 6,920,478 B2
(45) Date of Patent: Jul. 19, 2005

(54) METHOD AND SYSTEM FOR TRACKING THE ONLINE STATUS OF ACTIVE USERS OF AN INTERNET-BASED INSTANT MESSAGING SYSTEM

(75) Inventors: Dennis Mendiola, New York, NY (US); Brian Schlotman, Cincinnati, OH (US)

(73) Assignee: Chikka PTE Ltd., Singapore (SG)

( * ) Notice: Subject to any disclaimer, the term of this patent is extended or adjusted under 35 U.S.C. 154(b) by 789 days.

(21) Appl. No.: 09/846,376

(22) Filed: May 2, 2001

(65) Prior Publication Data

US 2002/0143916 A1 Oct. 3, 2002

Related U.S. Application Data

(60) Provisional application No. 60/203,583, filed on May 11, 2000.

(30) Foreign Application Priority Data

May 11, 2000 (SG) ................................. PCT/SG00/00069

(51) Int. Cl.[7] .............................................. G06F 15/16
(52) U.S. Cl. ......................... 709/203; 709/219; 709/224
(58) Field of Search ................................ 709/203, 219, 709/224

(56) References Cited

U.S. PATENT DOCUMENTS

| | | | | |
|---|---|---|---|---|
| 6,174,793 B1 | * | 1/2001 | Tsai et al. .................... | 438/588 |
| 6,292,668 B1 | * | 9/2001 | Alanara et al. ............. | 455/466 |
| 6,539,421 B1 | * | 3/2003 | Appelman et al. .......... | 709/206 |
| 6,571,136 B1 | * | 5/2003 | Staiger ......................... | 700/48 |
| 6,691,162 B1 | * | 2/2004 | Wick ........................... | 709/224 |
| 6,714,793 B1 | | 3/2004 | Carey et al. ................ | 455/466 |
| 2001/0003202 A1 | | 6/2001 | Mache et al. | |
| 2001/0003203 A1 | | 6/2001 | Mache | |

FOREIGN PATENT DOCUMENTS

| | | |
|---|---|---|
| EP | 0 898 431 A1 | 2/1999 |
| WO | WO 99 48011 | 9/1999 |
| WO | WO 00 16209 | 3/2000 |

OTHER PUBLICATIONS

U.S. Appl. No. 09/846,249, Instant Messaging Account System, filed May 2, 2001 (including Preliminary Amendment filed concurrently therewith).

U.S. Appl. No. 09/846,377, Method and System for Inviting and Creating Accounts for Prospective Uses of an Instant Messaging System, filed May 2, 2001 (including Preliminary Amendment filed concurrently therewith).

U.S. Appl. No. 09/928,433, Instant Messaging System and Method for Remote Networks Using a Sequential Message Handshaking Protocol, filed Aug. 14, 2001 (including Preliminary Amendment filed concurrently therewith).

* cited by examiner

*Primary Examiner*—Abio Etienne
*Assistant Examiner*—Emmanuel Coffy
(74) *Attorney, Agent, or Firm*—Intellectual Property Law Group LLP; Otto O. Lee; Juneko Jackson (57) ABSTRACT

A system and a method for establishing or specifying the online status of a user forming part of an instant messaging system. The IM system includes clients having IM client applications, an IM server, and a user information database that is selectively connected to the clients via the internet. The user database stores an activity status for each user's activity with the IM server system. The activity status includes: (i) a time variable signifying the time of or time since the last prescribed involvement with the IM server; and (ii) a probability variable signifying the likelihood of the user still being online. Monitoring means is provided to continuously monitor user activity with said IM server and to continuously update the activity status of users stored on the database. Checking means is also provided to check the activity status of each user stored on the database and adjust said probability variable.

11 Claims, 6 Drawing Sheets

METHOD AND SYSTEM FOR TRACKING THE ONLINE STATUS OF ACTIVE USERS OF AN INTERNET-BASED INSTANT MESSAGING SYSTEM

This application claims the benefit of priority from U.S. provisional application No. 60/203,583, filed May 11, 2000.

FIELD OF THE INVENTION

The present invention relates to a computer network based instant messaging system and more particularly to a method and system for tracking and specifying the online status of users of the system.

The invention has particular, although not exclusive, utility for users that use client applications such as Global System for Mobile Communications ("GSM") network devices, eg mobile phones, and internet browsers for accessing an instant messaging system. The invention also has utility for users that use personal computer-based client application and/or an email-based client application for accessing the system.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

Instant messaging ("IM") systems have become very popular in recent times with the increasing use of the internet and email by all sectors of the community as a communication medium. With internet use pervading the areas of the domestic market and being taken up by younger, computer-literate generations as a social medium in its own right, a need has arisen for spontaneous and "instantaneous" messages to be exchanged between two or more parties connected to the internet simultaneously. This need has not been able to able to be satisfied by the use of traditional email systems and consequently, IM systems have spawned as an alternative or adjunct to email.

"Instantaneous" in the context of IM means the ability to receive messages without prompting a message-handling server. This is in contrast to the way typical emails are sent and received by internet users.

To send and receive messages, popular personal computer-based email applications such as Eudora™ or Microsoft Outlook™, employ the Simple Mail Transfer Protocol ("SMTP") and the Post Office Protocol ("POP"). Using POP requires the recipient of an email to query or prompt an email server to which it has subscribed, for messages to download to the user's personal computer ("PC") or any other internet-connected device.

Email messages are sent by a user from an email PC client application (e.g., Eudora™, Microsoft Outlook™) on that users PC to a mail server to which it has subscribed using SMTP. The mail or SMTP server then forwards the message to the desired recipient's mail server via the internet.

Instant messaging systems work in a different fashion to email, requiring minimal if any user action, to receive messages. Messages are forwarded from a sender's client application, normally a PC-based IM client application program, to the intended recipient's client application via an IM server or directly to the recipient's client, almost in "real time" from the time that a message is sent by the sender, or received by the IM server system—hence "instant". No querying is needed to get a message to its intended recipient, reflecting more of a "pushing" technology, than a "pulling" of information. Examples of some popular IM systems in the market include AOL's AIM™ and ICQ™.

A characteristic of most IM systems is that a client user is able to set up a network of friends or colleagues, more commonly known as "buddies" with or amongst whom messages can be exchanged instantly. In most of the PC-based client applications, an IM sender must be authorized by the recipient (both are considered "buddies" of one another) to be able to receive messages from the sender. in such cases, an authorization is made by a user specifically instructing the IM server to allow messages to be received from particular senders In some IM systems, authorizations are not required for users to be included in a buddy list. This means that instant messages may be freely sent amongst existing users and a target user can be added to a particular buddy list of a user without that user requiring the explicit permission of the target user to be so included.

Authorizations may also be required by users to allow them to be detected by other users as being "online". "Online" in the context of IM means that a client user is connected to the Internet or is otherwise capable of receiving instant messages at a particular moment. The capability of being able to determine who amongst a user's group of buddies is online is an important functionality of IM systems. However, the extent to which existing IM systems can establish whether in fact certain types of client user are online or not, is limited.

Another limitation with current IM systems is that some are not designed to interconnect with particular types of client applications or different IM systems. For example, other client applications may include email-based client applications (eg Eudora™, Microsoft Outlook™) and browser based client applications (eg Internet Explorer™ and Netscape™) on the internet, and also devices connected into a GSM network, such as mobile phones.

GSM networks have their own form of IM system for communicating short textual messages between different subscribers known as "Short Message Service" ("SMS"). With SMS, a "Short Message Service Centre" ("SMSC") provides a server through which all SMS messages that are sent and received by client subscribers are handled. The messages are short, typically limited to 160 characters in length, and are sent between subscribers of the GSM network, with the SMSC processing the messages for delivery to the right destination using the GSM mobile number of the intended receiver. Under the SMS protocol, the textual message from the sender is initially sent to the SMSC server using the cellular telephone network. The SMSC then stores the message and allocates it to the intended recipient for downloading, in accordance with normal GSM protocol, when the recipient is identified to be active within a cell.

SMS messaging is normally only provided between GSM clients that specifically subscribe to it, however, by virtue of the SMSC server, it is possible to connect to the internet using a particular protocol, dependent upon the particular GSM phone and network manufacturer. For example, Nokia™ uses Computer Interface Message Distribution protocol version Two (CIMD2).

Although the online status of users connected to the internet by way of a PC-based client application is relatively simple, establishing the online status of users having browser-based client applications and GSM client applications is more difficult and generally is not undertaken in the art.

"Online" detection of the GSM client user deserves special mention. Due to the less than perfect coverage and stability of GSM carrier networks, a GSM subscriber may experience intermittent interruptions of coverage and hence inability to receive SMS. Further, the carriers themselves may be reluctant to allow third parties to alter their GSM system settings to allow detection by others of whether a GSM subscriber is within the coverage area of the GSM network or not—and hence whether they are online.

SUMMARY OF THE INVENTION

It is an object of the present invention to provide for establishing or specifying the online status of users who may be capable of instant messaging having browser-based or GSM device client applications.

In accordance with one aspect of the present invention, there is provided a system for establishing or specifying the online status of a user forming part of an instant messaging system comprising a plurality of clients having IM client applications of the same or different types and an IM server selectively connected to each of said clients via a computer network, the system comprising:

a user database for storing an activity status for each user of the IM system with respect to the IM server, said activity status including: (i) a time variable signifying the time of or time since the last prescribed involvement of the user with said IM server; and (ii) a probability variable signifying the likelihood of the user still being online;

monitoring means to continuously monitor user activity with said IM server and to continuously update the activity status of users stored on said database involved with said activity; and checking means to check the activity status of each user stored on said database and adjust said probability variable in a prescribed manner having regard to said time variable.

Preferably, said client types include clients connected to the computer network via:

(i) a PC-based instant messaging client application program;
(ii) a GSM device on a GSM network;
(iii) an internet browser-based client application; or
(iv) an email-based client application.

Preferably, said prescribed involvement with said IM server includes:

(i) one client sending a message to another;
(ii) one client successfully receiving a message sent from another;
(iii) one checking the activity status of another user(s); and
(iv) other activities, involving the IM server system, that can be detected by computer and electronic methods.

Preferably, said computer network is the internet and/or any direct electronic link.

Preferably, said client types connected to the computer network via the GSM network have SMS capability and are initially connected to the computer network via an SMSC server to control and manage said SMS therebetween, said SMSC server and said IM server being directly interconnected via said computer network, and wherein said SMSC server provides an indication to said monitoring means of the activity of targeted recipient GSM clients in response to messages sent to the SMSC server for delivery thereto by said IM server.

In accordance with another aspect of the present invention, there is provided a method for establishing or specifying the online status of a user forming part of an instant messaging system comprising a plurality of clients having IM applications of the same or different types, selectively interconnected to an IM server by way of a computer network, the method comprising the following steps:

storing an activity status for each user of the IM system with respect to the IM server, said activity status including: (i) a time variable signifying the time of or time since the last prescribed involvement of the user with said IM server; and (ii) a probability variable signifying the likelihood of the user still being online;

continuously monitoring user activity with said IM server;
continuously updating the stored activity status of users involved with said activity;
checking the stored activity status of each user; and
adjusting said probability variable in a prescribed manner having regard to said time variable.

BRIEF DESCRIPTION OF THE DRAWINGS

The invention will be better understood in the light of the following description of one specific mode thereof. The description is made with reference to the accompanying drawings, wherein.

DETAILED DESCRIPTION OF THE INVENTION

The particular mode for carrying out the preferred embodiment of the invention is directed towards a system for establishing or specifying the online status of a user and a method for performing the same, which forms part of an instant messaging ("IM") system.

Figure 1:
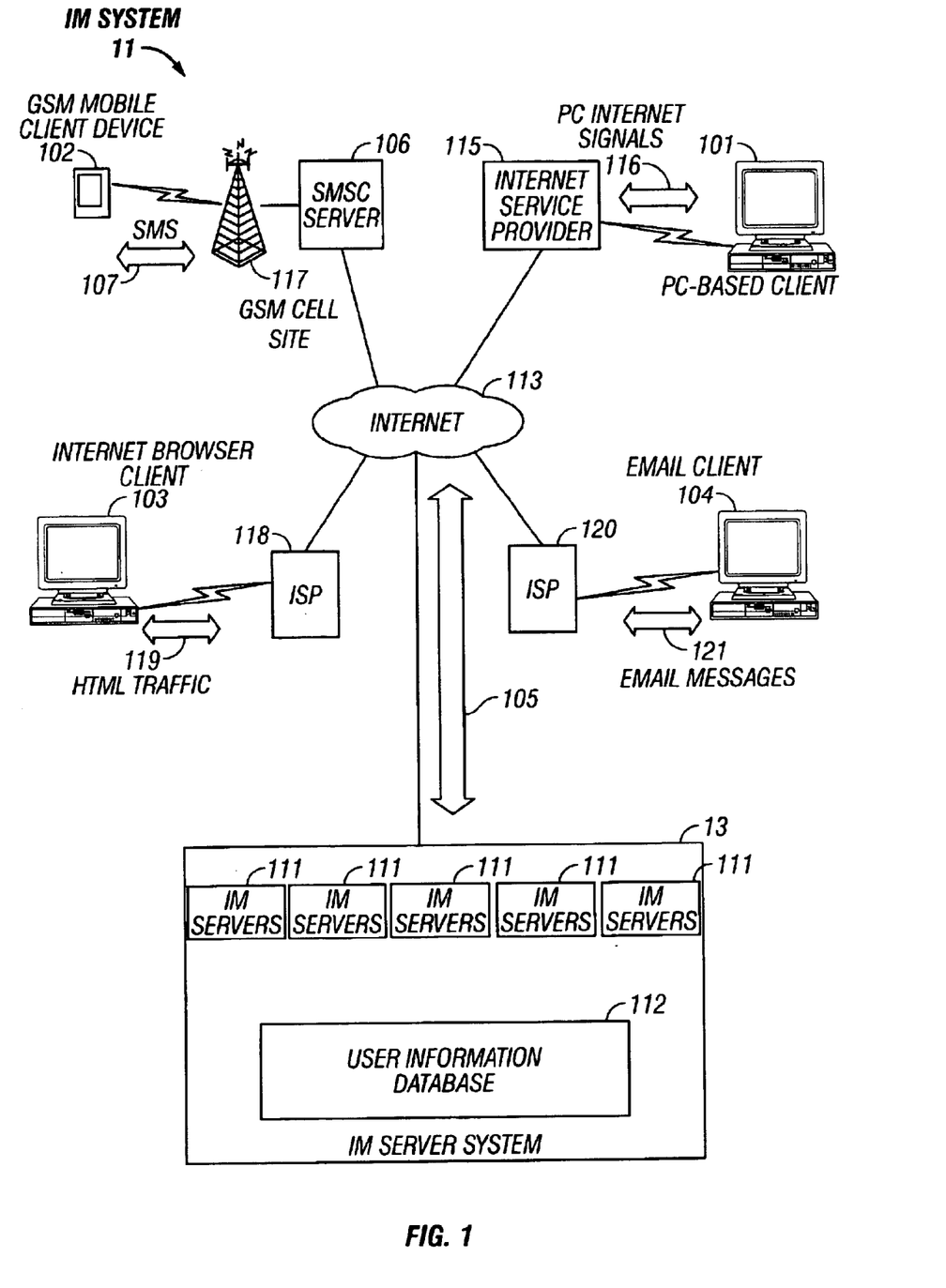
FIG. 1 is a schematic block diagram showing the general arrangement of the IM system with different client applications connected to the IM server.

As shown in FIG. 1 of the drawings, the IM system 11 of the present mode essentially comprises a plurality of clients having IM client applications of the same or different types 101, 102, 103 and 104 and an IM server system 13. The IM server system 13 comprises a plurality of discrete IM servers 111 and a user information database 112, and is selectively connected to each of the clients via the internet 113 for sending and receiving messages and commands as represented by the arrow 105 amongst the IM community. The users or clients may be selectively connected to the IM server system 13 via the internet 113 using any or all of the following terminals or appliances:

- a PC-based client 101 connected via an Internet Service Provider ("ISP") 115, where PC internet signals 116 are communicated between the PC client application 101 and the ISP 115,
- a GSM mobile client 102 connected via a GSM cell site 117 and SMSC server 106, where SMS messages are transmitted 107 between the GSM device 102 and the SMSC server 106,
- an internet browser client 103 via an ISP 118, where HTML traffic 119 is conveyed between the browser client 103 and the ISP 118, and
- an email client 104 via an ISP 120, where email messages 121 are communicated between the email client 104 and the ISP 120.

The IM server system 13 employs an activity- and time-based method for specifying the "online" status of the IM system's users. This entails the IM server system 13 assessing the online status of a user by constantly checking to see when its last activity took place and attaching a decreasing probability to that user being "online" as time goes by.

With respect to a GSM client 102, certain SMSC server systems 106, or SMS messaging systems operated thereby, indicate readily whether a subscriber client to SMS on the GSM network is reachable or unreachable by SMS, when an actual SMS message is sent to the GSM client user. This gives a more definitive statement of the online status of the GSM client user than would otherwise be the case and is used to advantage by the IM server system 13 in establishing the online status of GSM client users of the IM system.

It should be noted that a user is said to be "online" within an IM context, if that user can be reached by, or can receive, instant messages. However, due to the less than perfect stability and coverage of the different clients (PC application 101, GSM device 102, internet browser 103, and email clients 104), "online" is not a definitive status but more of a probabilistic statement as to whether that user can receive instant messages.

Figure 2:
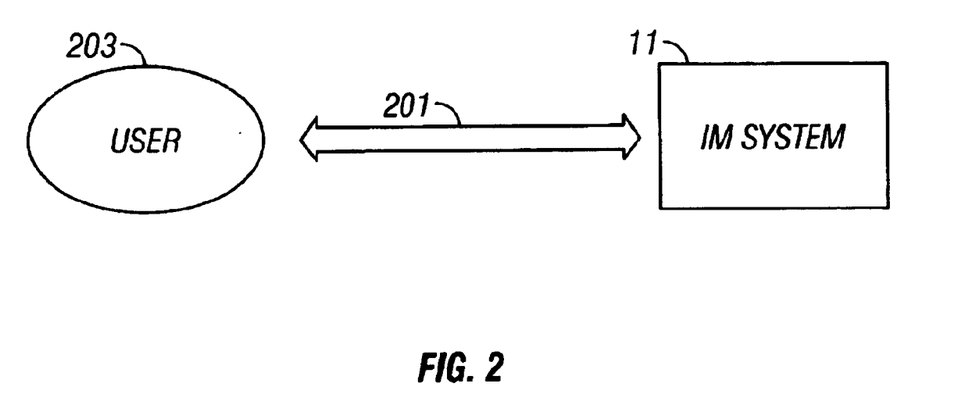
FIG. 2 is a schematic diagram showing the online tracking relationship between a user and the IM server.

As shown in FIG. 2, the present mode is concerned with tracking activity 201 between a user or member 203 of the IM community and the IM server system 11. More specifically, this involves a method for assigning "online" status flags that are based on user activity 201 involving the IM system 11.

Activity is more broadly defined as anything that involves the IM server system 13 that can detected by computer and electronic methods. In the present mode, these activities include the following:

sending a message to an IM user, successfully receiving a message from an IM user, and the user proactively interacting with the IM server system, such as checking other "online" users through an electronic trigger or command.

For the purpose of the preferred embodiment of the present mode, however, the method of tracking activity is limited to sending and receiving messages, and to checking other online users.

It should be appreciated, however, that the requisite amount of activity that may occur for establishing whether an IM community member or user is online, and the method employed for tracking and updating the status of this member or user, is highly dependent upon the particular client type involved. In some cases a greater degree of accuracy is achieved by using direct feedback mechanisms that may be provided by the client device itself, such as GSM clients using SMS 107, browser-based clients using HTML documents 119 containing executable content, and PC-based client applications using signals sent over the Internet.

PC-based client applications 101, in particular, can be customised to have a constant "ping-ing" capability back to the IM server system 13. Ping-ing involves sending a prescribed set of signals to another computer—the IM server, in this instance—through the computer network. In such instances, the "ping-ing" action provides a constant notification to the IM server system 13 that the user of the application is still connected to the internet, or otherwise, and thus is "online".

In the present mode, each "activity" event that is detected by the IM server system 13 is noted and time-stamped. Time stamping means that the IM server notes the instant time when the detected activity took place.

This process is as follows:

The IM server notes some activity taking place.

The IM server then determines who is responsible for the activity.

The user(s) is(are) identified.

A "flag" is put up for the user and the time noted, ie a time variable X is given a time.

That time connotes the last time the user had any activity concerning the IM server and hence, represents the last time that the user was DEFINITELY online.

All things equal, the IM server assumes that the user is "probably" capable of receiving instant messages the closer the time from when a detected activity occurred; as time elapses, the less the probability that the user is capable of receiving instant messages.

In order to perform this method, the user information database 112 stores an activity status for each user of the IM system. This activity status includes: (i) a time variable signifying the time of or time since the last prescribed involvement of the user with said IM server; and (ii) a probability variable signifying the likelihood of the user still being online.

The IM server system 13 is programmed to provide monitoring means to continuously monitor user activity with the IM server and to continuously update the activity status of users stored on the database 112 associated with any detected activity with the IM server system. Thus, whenever the monitoring means detects user activity, it notes the activity, flags the user, and time stamps the event.

The IM server system 13 is also programmed to provide checking means to check the activity status of each user stored on the database 112 and adjust the probability variable having regard to the time variable in a manner that will be described in more detail below. At regular intervals, the checking means accesses the stored time variable to determine how much time has elapsed since the last activity occurred. The adjustment of the probability variable simply involves toggling a set of labels identifying the online status of the user as certain time threshold points are reached.

A user's online status label can be made definitive; either the user is 'Online' or 'Offline'. The preferred embodiment, however, introduces varying degrees of being online, e.g., 'Likely Online' or 'Likely Offline'. Thus different time thresholds are specified within the system, which if reached, toggle a user's status accordingly.

Figure 3:
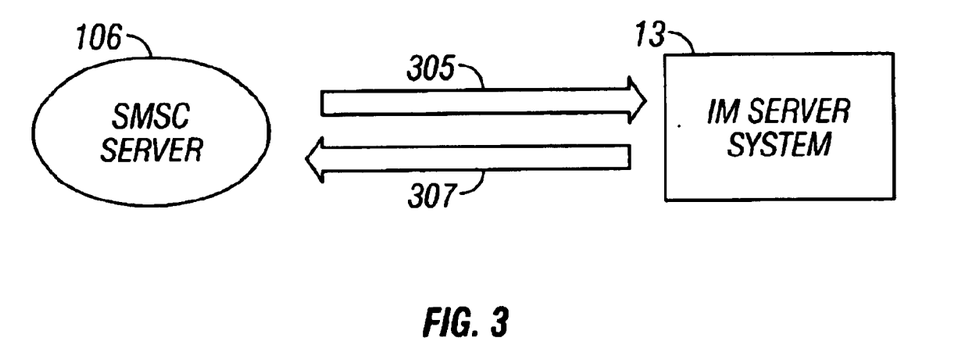
FIG. 3 is a schematic diagram showing the online tracking relationship between a user using a GSM device connected to a GSM network and the IM server.

In the case of IM community members being users of devices under the GSM network, as shown in FIG. 3, monitoring of activity between the GSM device 102 and the IM server system 13 is undertaken. Activity such as a GSM user sending a message or a command to query list online buddies is represented by arrow 305, and activity such as a GSM user receiving a message or receiving a list of online buddies in response to a command requesting same, is represented by arrow 307.

As mentioned earlier, certain GSM messaging systems (e.g., Nokia™ SMSC) have immediate feedback mechanisms that can inform the sender whether an SMS message has been successfully delivered to a GSM device 102 of the user—hence suggesting the user is Online or Offline. This feature is used by the monitoring means of the IM server system 13 to establish a GSM subscriber's/user's online status. Hence, when an instant message or SMS is sent 307 to a GSM subscriber 102 via the SMSC server 106, the IM server system 13 gets immediate feedback as to whether the message was successfully delivered to the GSM client device 102 or not. With Nokia's™ SMSC server, for instance, a status feedback is made available to the IM server 13, which says that the message was received either successfully or unsuccessfully by the GSM client device 102.

Figure 4:
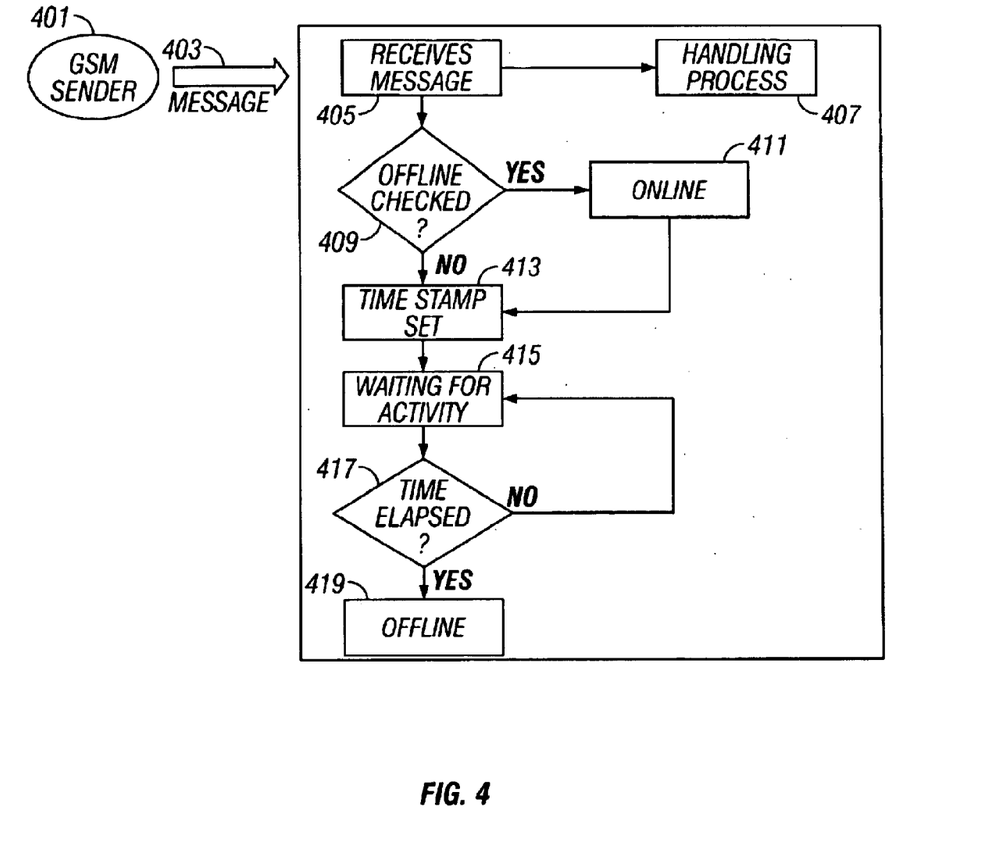
FIG. 4 is a block diagram flow chart showing the method followed in updating, checking and adjusting the activity status of a GSM user after the IM server receives a message or command from the GSM user.
Figure 5:
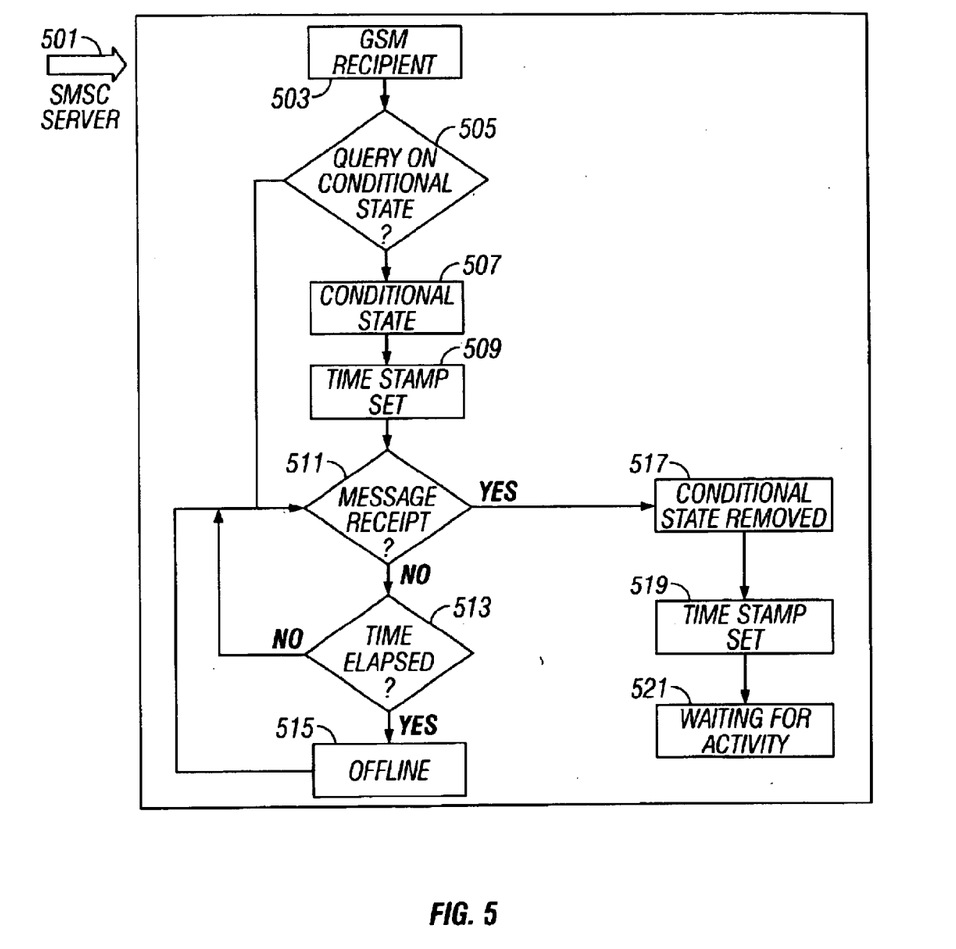
FIG. 5 is a block diagram flow chart showing the method followed in updating, checking and adjusting the activity status of a GSM user after a message for that user is sent to the SMSC server by the IM server from another user.

An illustration of the logic flow of this arrangement where a GSM client user operates under a GSM carrier using Nokia's™ SMSC messaging system is shown in FIGS. 4 and 5.

The activities that are noted and time stamped by the monitoring means of the IM server system are:

1. An instant message sent by any monitored user.
2. An instant message successfully received or downloaded by the client of the user.
3. An instant message sent to the SMSC server and successfully downloaded to the GSM client device.
4. Querying of the IM server for Buddy Online lists.

The status flags that are used as probability variables and the time thresholds that are used as time variables in the user information database are as follows:

| Status Flag | Time elapsed from activity |
|---|---|
| "Online" | t < 15 minutes |
| "Offline" | 30 minutes ≦ t |

In the case of an instant message sent by GSM client user (GSM Sender) 401 to another user, this activity represented by arrow 403, the logical flow of operation of the IM server system 13 is as follows:

Time=0
  GSM Sender's probability variable activity status is "Offline".
  GSM Sender sends message 403.
  IM server detects the activity, ie receives the message or command 405.
  IM server initiates the message/command handling process 407.
  IM server checks whether the probability variable activity status for the user is "Offline" 409, and if so, flags or toggles GSM Sender as "Online" 411.
  IM server time stamps the event by entering the time variable activity status 30 minutes into the future 413.
Time=5 minutes
  IM server waits for more activity 415.
  No activity detected.
  IM server constantly monitors time elapsed 417.
  GSM Sender still flagged "Online".
Time=15 minutes
  IM server waits for more activity 415.
  No activity detected.
Time=30 minutes
  No activity detected and 30 minutes has elapsed.
  IM server flags GSM Sender probability variable as "Offline" 419.

In the case of an instant message received by a GSM client user (GSM Recipient) from another user, this activity represented by arrow 501, the logical flow of operation of the IM server system 13 is as follows:

Time=0
  Other IM user sends an instant message to GSM Recipient.
  IM server facilitates conversion of message into SMS form and sends message to SMSC server 501.
  SMSC server sends message to GSM Recipient 503.
  IM server checks whether user on conditional state 505, and if not, toggles user into conditional state 507 and sets time stamp 5 minutes into the future 509.
  IM server checks whether GSM device has acknowledged receipt of message 511.
  If receipt is not acknowledged, IM server checks whether time stamp has elapsed 513, and if not checks again for acknowledgement 511—it continuously does this until either the time stamp matures, or the GSM device acknowledges reception of message.
  If GSM device has acknowledged receipt of message, the SMSC server relays this event to the IM server which removes the conditional state of the user 517.
  IM server sets time stamp to 30 minutes ahead 519.
  IM server flags GSM Recipient as "Online" and waits for more activity 521.
Time=5 minutes
  No further activity detected by IM server.
  If receipt of message previously sent was not acknowledged by GSM device, the IM server checks whether time stamp has elapsed 513, and if so, toggles user status to offline 515.
Time=15 minutes
  No further activity detected by IM server.
Time=20 minutes
  Another IM user sends an instant message to GSM Recipient.
  SMSC server sends message to GSM Recipient.
  GSM device fails to accept SMS and does not acknowledge within 5 minutes (i,e., time>25 minutes),
  SMS stored at SMSC server for later transmission, when the GSM device is available to download SMS.
  SMSC server notes this unavailability, and relays status to IM server.
  IM server notes the conditional state, the overdue timestamp and SMSC server response and promptly keeps the GSM Recipient flag "Offline".
Time=35 minutes
  SMSC server finally detects the availability of the GSM device to receive SMS.
  SMS is downloaded into the GSM Recipient's GSM device.
  The SMSC server relays the status back to the IM server.
  IM server flags GSM Recipient "Online."

Figure 6:
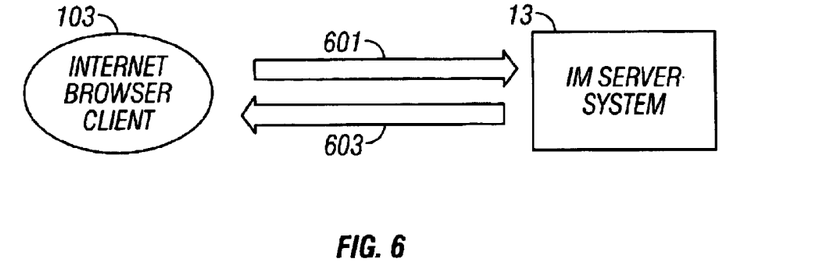
FIG. 6 is a schematic diagram showing the online tracking relationship between a browser-based user and the IM server.

In the case of IM community members being users of an internet browser client, the monitoring of activity between a browser client user 103 and the IM server system 13 is similar to that of a GSM client user. As shown in FIG. 6, activities such as sending a message or a command querying for buddies online are sent as HTML format requests as represented by arrow 601, and activities such as receiving a message or a list of online buddies as requested by a command, are provided as HTML pages, as represented by arrow 603.

As with all client users types, the IM server system 13 constantly checks for when the last activity occurred and checks the time elapsed to see if certain thresholds have been reached. The activity status of the browser user is flagged accordingly.

Figure 7:
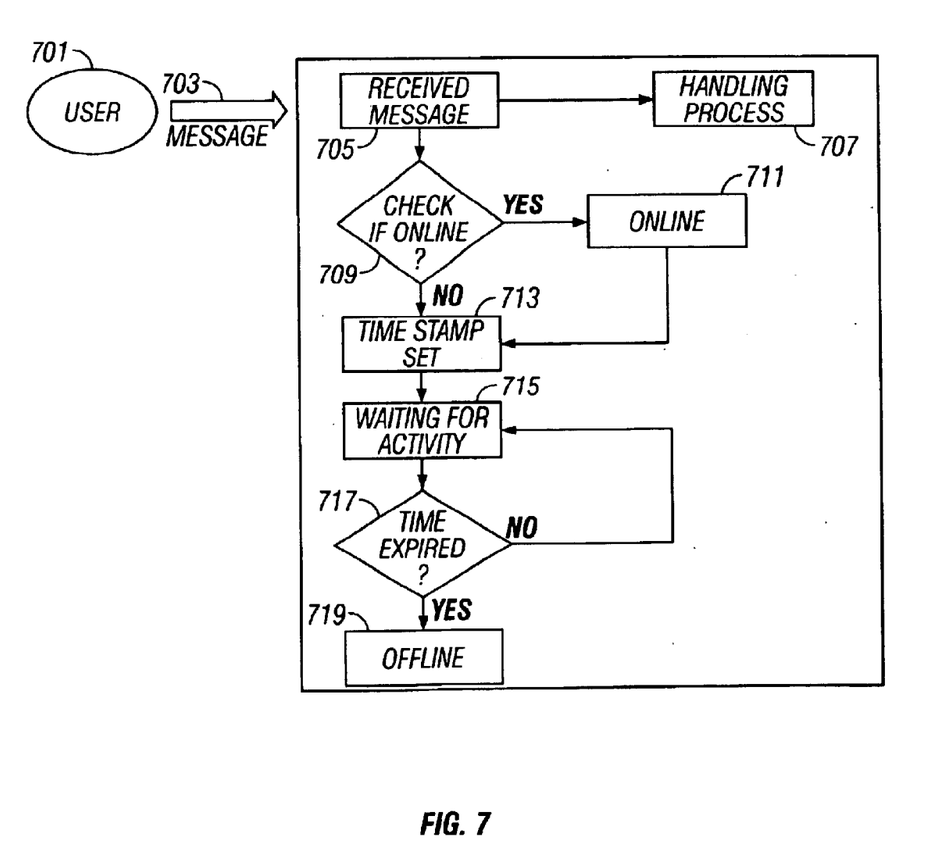
FIG. 7 is a block diagram flow chart showing the method followed in updating, checking and adjusting the activity status of a user after receiving a message or command from a browser-based user.

As shown in FIG. 7, a IM community member/user 701 using a Web browser client application for connecting to the IM system sends a message to a user or a command to the IM server 13 for a list of online buddies, as an HTML request represented by arrow 703. This is detected by the IM server as an activity indicating that the user 701 is online and thus invokes a routine which follows the following logical flow:

IM server receives the message/command 705 and the message/command handling process is invoked 707.

IM server checks the probability variable of the activity status of the user to see if the user was previously recorded as offline 709.

If so, the probability variable is flagged or toggled to indicating the user as being online 711.

If the user was not previously offline, or after toggling to being online, the time variable of the activity status is time stamped to 30 minutes into the future 713 and the IM server waits for further activity 715.

IM server subsequently checks whether the time stamp entered for the time variable of the user has expired 717.

If so, the probability variable is flagged or toggled to indicating that the user is offline 719, in the event of there being no further activity detected for that user.

If the time stamp has not expired, the IM server maintains checking 717.

Feedback mechanisms for browser-based clients would normally have been limited to when the user queries or prompts the IM server 13 with an activity via the browser. However, with the introduction of certain browser application modules, such as the JAVA™ Applets™ and scripts, it is possible for the browser client to regularly inform the IM server of the user's online status (ie whether the user is connected to the internet using their browser). This is possible even if the browser client does not engage in any of the activities described herein.

This is possible if the web browser is served with a web page containing executable content. This content directs the browser to query the server for messages to the user at set intervals, and also notifies the IM system that the user is still online. As long as the user's browser contains that web page, it will always, at set intervals, cause its time stamp entry in the time variable of the activity status recorded for the user on the IM server, to be refreshed.

Furthermore, if the user exits from their browser, or clicks on a button saying logout, then the IM server can be notified directly.

The IM server is designed to send a message refresh to the browser that the executable content in the Web page directs the browser to acknowledge. Every message refresh sent to the browser makes the IM server toggle the user's status into a conditional state that can only be reset by an acknowledgment received from the user's web browser. It could also be the other way around: the Web page with the executable content sends a message refresh to the IM server that is acknowledged by the IM server. Every message refresh sent to the IM server tells the IM server to retain the user's online, and the IM server time stamps the event by entering the time variable activity status into the future in defined time increments.

Figure 8:
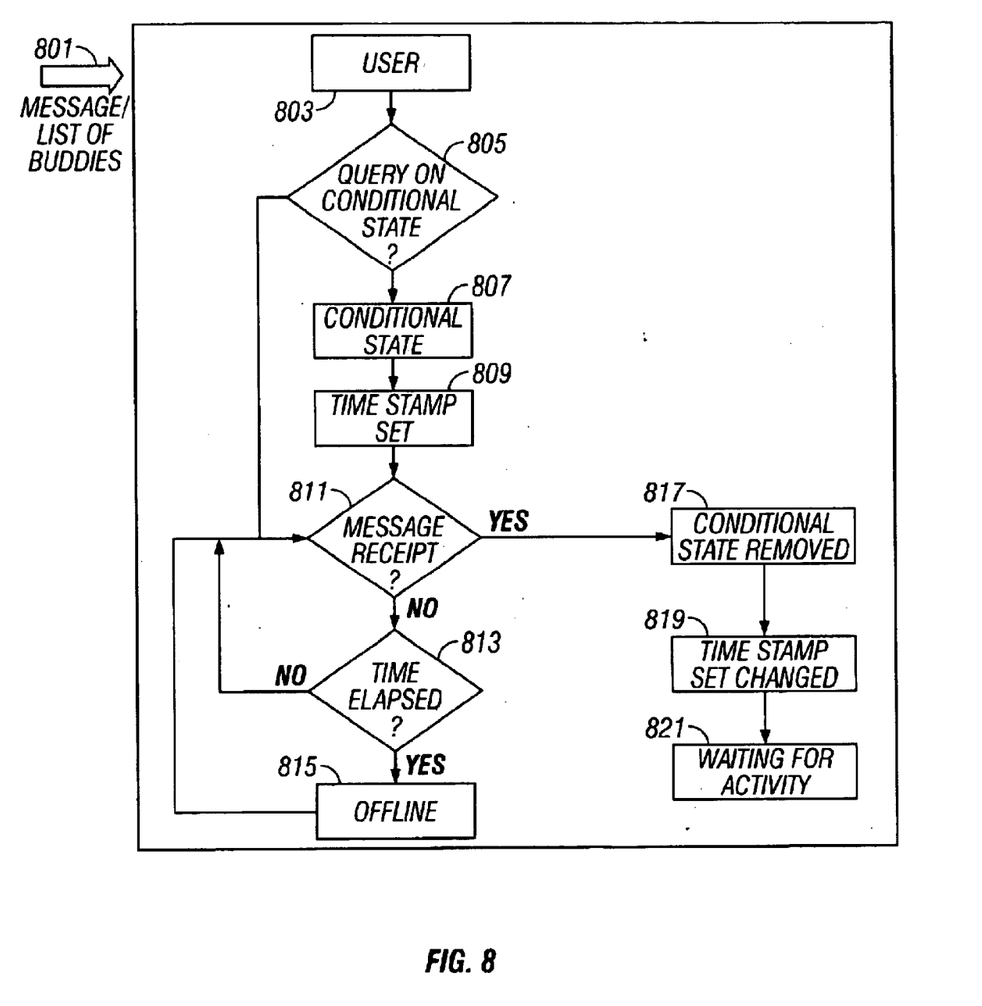
FIG. 8 is a block diagram flow chart showing the method followed in updating, checking and adjusting the activity status of a browser-based user after a message for that user from another user is sent to the user by the IM server.

As shown in FIG. 8, the logical flow of operation that occurs as a result of a internet browser user receiving a message or being provided with a list of online buddies, represented by arrow 801 is as follows:

IM server sends message or list of buddies to user 803.

IM server checks if user's status is in conditional state 805.

If not, IM server changes user's status to conditional state 807 and enters time stamp into time variable of activity status for user 5 minutes into the future 809.

If user's status was already in a conditional state, or after changing to such, IM server checks if user's browser has confirmed receipt of message or list of buddies 811.

If not, IM server checks whether time stamp entry into time variable of activity status has elapsed 813, if so, toggles probability variable for user to offline 815, or if not continues to check if users browser has confirmed receipt of message/list 811.

If confirmation of receipt of message/list received from user, IM server removes conditional state 817 from user status, changes time stamp to 30 minutes ahead 819 and waits for more activity 821.

It should be noted that the preferred embodiment of the present mode of the invention provides for a general method for flagging IM users as to their online status, which is primarily activity- and time-based. However, depending on the client type, enhancements to the process exist, which can dramatically improve accuracy.

Thus with certain GSM messaging systems, for instance, having feedback mechanisms that allow the IM server system to detect if SMS messages have been successfully downloaded by the GSM device—hence, suggesting that the GSM client user is online—the preferred embodiment provides for a specific methodology to accommodate the same to achieve greater accuracy. Similarly with browser-based clients having JAVA™ Applets™ and scripts, for instance, Web pages can be programmed to send regular status reads to the IM server. Accordingly the preferred embodiment again provides for a specific methodology to accommodate the same and thus achieves greater accuracy.

It should be appreciated that the scope of the present invention is not limited to the specific mode and the embodiment thereof described herein. Accordingly changes and improvements to the embodiment that amount to no more than common general knowledge are not considered to depart from the spirit or scope of the invention.

We claim:

1. A system for establishing or specifying the online status of a user forming part of an instant messaging system comprising a plurality of clients having IM client applications of the same or different types and an IM server selectively connected to each of said clients via a computer network, the system comprising:

a user database for storing an activity status for each user of the IM system with respect to the IM server, said activity status including: (i) a time variable signifying the time of or time since the last prescribed involvement of the user with said IM server; and (ii) a probability variable signifying the likelihood of the user still being online;

monitoring means to continuously monitor user activity with said IM server and to continuously update the activity status of users stored on said database involved with said activity; and checking means to check the activity status of each user stored on said database and adjust said probability variable in a prescribed manner having regard to said time variable.

2. The system as claimed in claim 1, wherein said client types include clients connected to the computer network via: (i) a PC-based instant messaging client application program; (ii) a GSM device on a GSM network; (iii) an internet browser-based client application; or (iv) an email-based client application.

3. The system as claimed in claim 1, wherein said prescribed involvement with said IM server includes: (i) one client sending a message to another; (ii) one client successfully receiving a message sent from another; (iii) one checking the activity status of another user(s); and (iv) sign on activities, involving the IM server system, that can be detected by computer and electronic methods.

4. The system as claimed in claim 1, wherein said computer network is the internet and/or any direct electronic link.

5. The system as claimed in claim 1, wherein said client types connected to the computer network via the GSM network have SMS capability and are initially connected to the computer network via an SMSC server to control and manage said SMS therebetween, said SMSC server and said IM server being directly interconnected via said computer network, and wherein said SMSC server provides an indication to said monitoring means of the activity of targeted recipient GSM clients in response to messages sent to the SMSC server for delivery thereto by said IM server.

6. The system as claimed in claim 1, wherein the prescribed manner for adjusting said probability variable comprises toggling a set of status labels identifying the online status of the user as certain time threshold points are reached.

7. The system as claimed in claim 6, wherein the set of status labels comprise the status labels of Online, Offline, Likely Online or Likely Offline.

8. A method for establishing or specifying the online status of a user forming part of an instant messaging system comprising a plurality of clients having IM applications of the same or different types, selectively interconnected to an IM server by way of a computer network, the method comprising the following steps:

storing an activity status for each user of the IM system with respect to the IM server, said activity status including: (i) a time variable signifying the time of or time since the last prescribed involvement of the user with said IM server; and (ii) a probability variable signifying the likelihood of the user still being online;

continuously monitoring user activity with said IM server continuously updating the stored activity status of users involved with said activity;

checking the stored activity status of each user; and adjusting said probability variable in a prescribed manner having regard to said time variable.

9. The method as claimed in claim 8, wherein checking the stored activity status of each user comprises accessing the stored time variable at regular intervals to determine how much time has elapsed since the last activity occurred.

10. The method of claim 9, wherein the prescribed manner for adjusting the probability variable comprises toggling a set of status labels identifying the online status of the user as certain time threshold points are reached.

11. The method of claim 10, wherein the set of status labels comprise the status labels of Online, Offline, or Likely Online or Likely Offline.

* * * * *